US012699527B2

(12) United States Patent
Dongaonkar et al.

(10) Patent No.: US 12,699,527 B2
(45) Date of Patent: Aug. 4, 2026

(54) TWO-DIMENSIONAL DATA ACCESS FOR VOLATILE MEMORY

(71) Applicant: Intel Corporation, Santa Clara, CA (US)

(72) Inventors: Sourabh Dongaonkar, Portland, OR (US); Shigeki Tomishima, Portland, OR (US); Jawad Khan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/866,165

(22) Filed: Jul. 15, 2022

(65) Prior Publication Data

US 2022/0350525 A1      Nov. 3, 2022

(51) Int. Cl.
*G06F 3/00* (2006.01)
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
None
See application file for complete search history.

(56) References Cited

U.S. PATENT DOCUMENTS

| | | | | |
|---|---|---|---|---|
| 9,984,748 B1* | 5/2018 | Lee | ......................... | G06F 3/0659 |
| 2016/0307625 A1* | 10/2016 | Lee | .................... | G11C 13/0026 |
| 2019/0146717 A1 | 5/2019 | Khan et al. | | |
| 2019/0220352 A1* | 7/2019 | Cha | .................. | G11C 29/56012 |
| 2021/0407564 A1 | 12/2021 | Dongaonkar et al. | | |

OTHER PUBLICATIONS

Barth, J., et al., "A 45nm SOI Embedded DRAM Macro for POWER7 32MB On-Chip L3 Cache" , ISSCC 2010; Session 19; High-Performance Embedded Memory; 19.1, 3 pages.
Hamzaoglu, F., et al., "A 1Gb 2GHz Embedded DRAM in 22nm Tri-Gate CMOS Technology" , ISSCC 2014; Session 13; Advanced Embedded Memory 13.1, 3 pages.
Heald, R., et al., "64-KByte Sum-Addressed-Memory Cache with 1.6-ns Cycle and 2.6-ns Latency", IEEE Journal of Solid State Circuits, vol. 33, No. 11, Nov. 1998; pp. 1682-1689.

* cited by examiner

*Primary Examiner* — Midys Rojas
(74) *Attorney, Agent, or Firm* — Essential Patents Group, LLP

(57) ABSTRACT

An example of an apparatus may include memory organized as at least one bank that includes two or more arrays, and circuitry communicatively coupled to the memory to select respective rows of the two or more arrays of a bank for a memory access operation based on an access orientation signal. Other examples are disclosed and claimed.

17 Claims, 12 Drawing Sheets

10
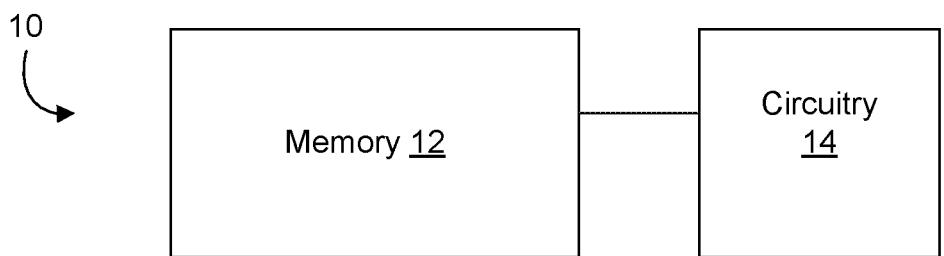
FIG. 1
20
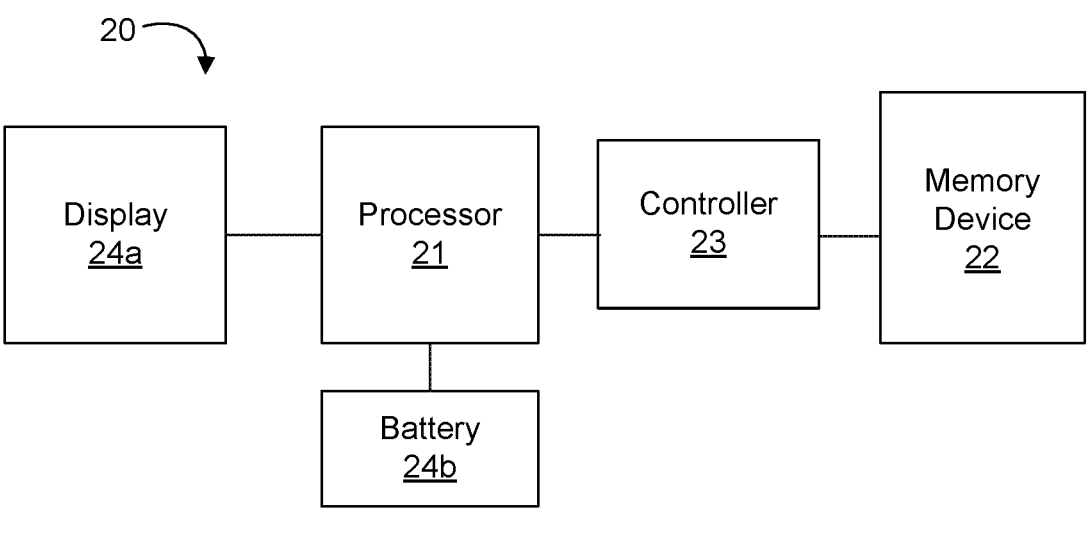
FIG. 2
25
Control access to a memory device organized as two or more banks with two or more arrays per bank  26
Provide two-dimensional data access for the two or more banks of the memory device  27
Ⓑ
Ⓒ
FIG. 3A

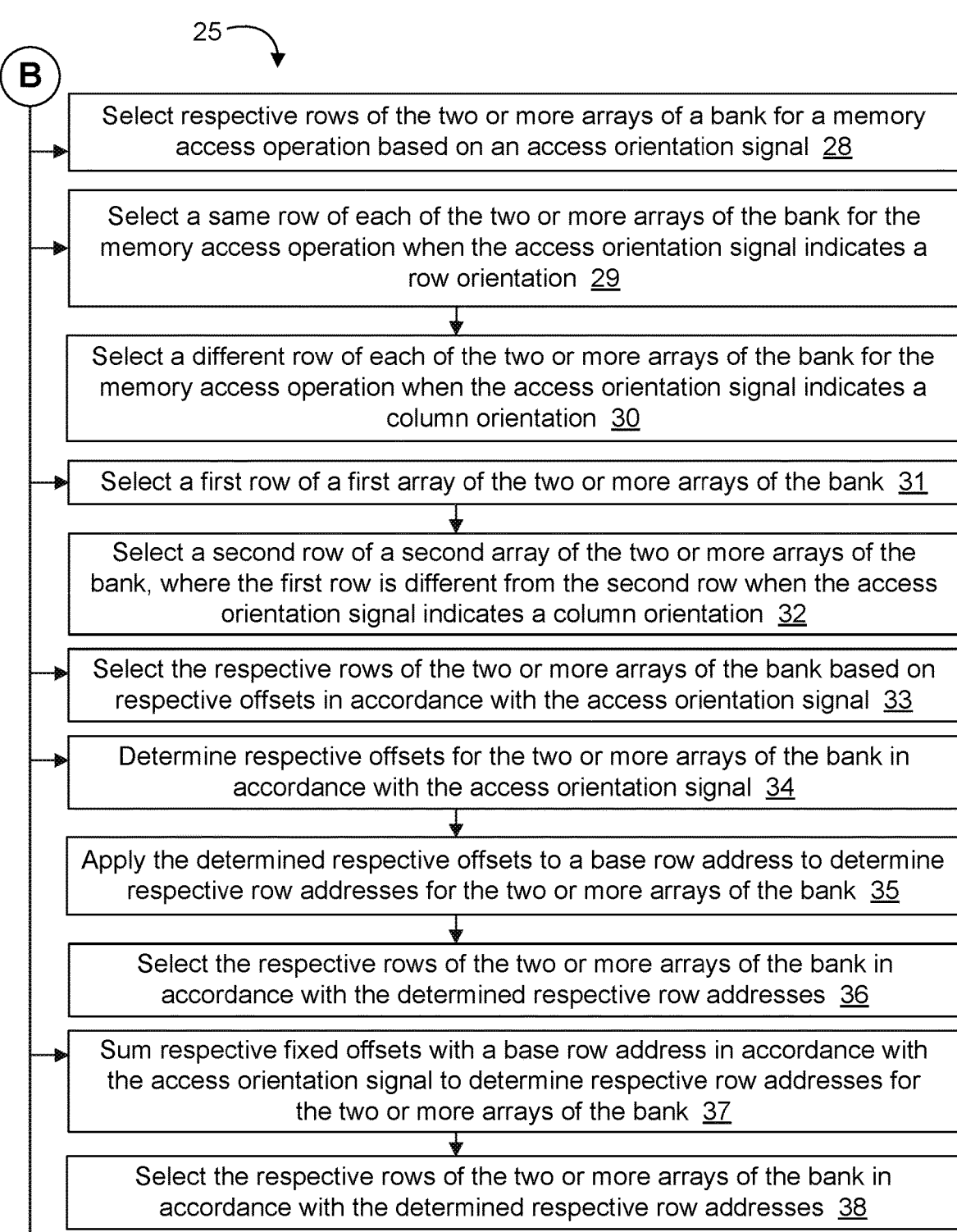

25

B

Select respective rows of the two or more arrays of a bank for a memory access operation based on an access orientation signal 28

Select a same row of each of the two or more arrays of the bank for the memory access operation when the access orientation signal indicates a row orientation 29

Select a different row of each of the two or more arrays of the bank for the memory access operation when the access orientation signal indicates a column orientation 30

Select a first row of a first array of the two or more arrays of the bank 31

Select a second row of a second array of the two or more arrays of the bank, where the first row is different from the second row when the access orientation signal indicates a column orientation 32

Select the respective rows of the two or more arrays of the bank based on respective offsets in accordance with the access orientation signal 33

Determine respective offsets for the two or more arrays of the bank in accordance with the access orientation signal 34

Apply the determined respective offsets to a base row address to determine respective row addresses for the two or more arrays of the bank 35

Select the respective rows of the two or more arrays of the bank in accordance with the determined respective row addresses 36

Sum respective fixed offsets with a base row address in accordance with the access orientation signal to determine respective row addresses for the two or more arrays of the bank 37

Select the respective rows of the two or more arrays of the bank in accordance with the determined respective row addresses 38

The memory device may comprise embedded memory (e.g., eDRAM) 39

FIG. 3B

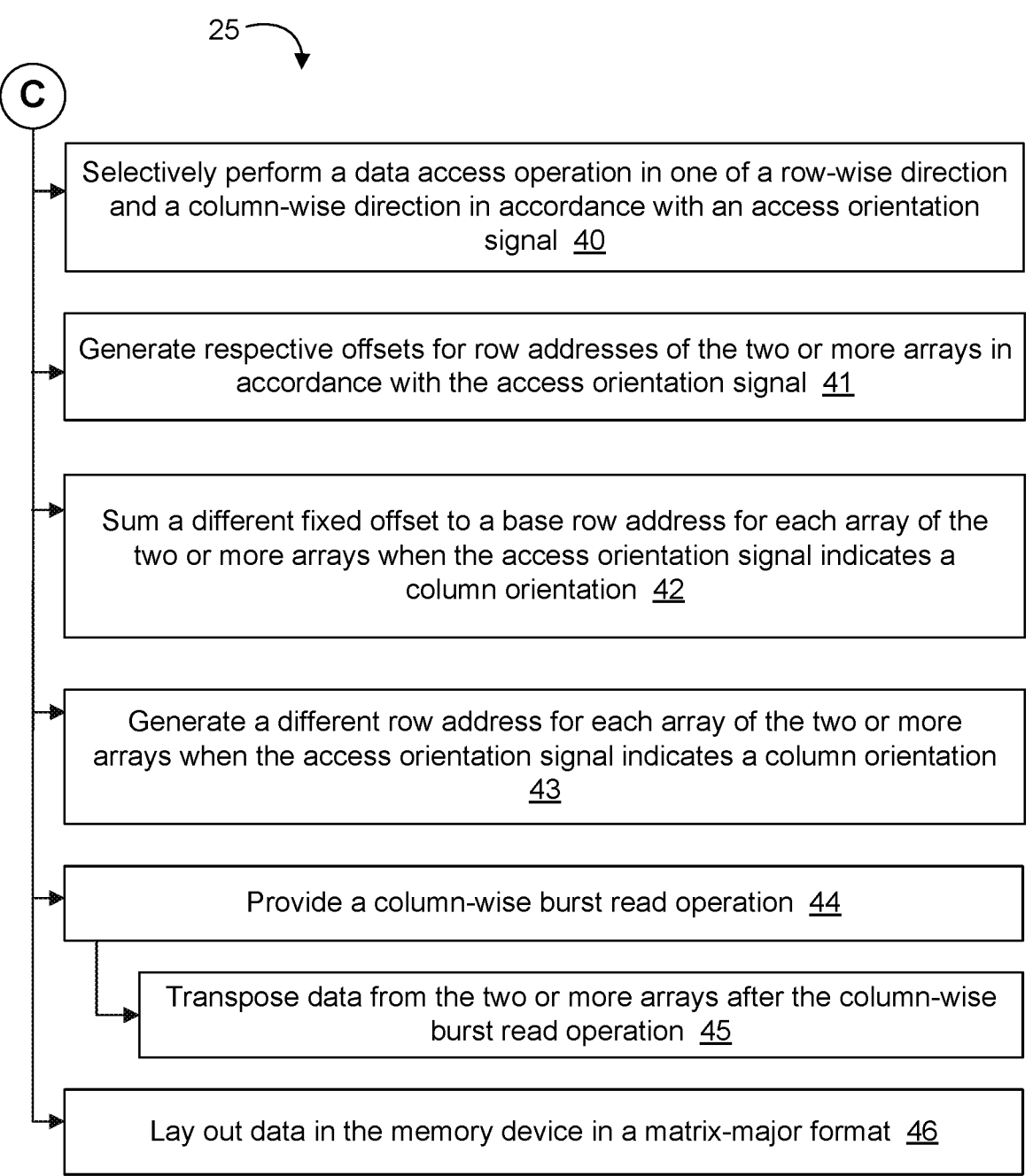

25

C

Selectively perform a data access operation in one of a row-wise direction and a column-wise direction in accordance with an access orientation signal  40

Generate respective offsets for row addresses of the two or more arrays in accordance with the access orientation signal  41

Sum a different fixed offset to a base row address for each array of the two or more arrays when the access orientation signal indicates a column orientation  42

Generate a different row address for each array of the two or more arrays when the access orientation signal indicates a column orientation  43

Provide a column-wise burst read operation  44

Transpose data from the two or more arrays after the column-wise burst read operation  45

Lay out data in the memory device in a matrix-major format  46

Access_Orientation = Row

ROW
SELECT
48a

Array_1 . . . Array_N

Bank

48

Access_Orientation = Column

ROW
SELECT
48a

Array_1 . . . Array_N

Bank

FIG. 8

TWO-DIMENSIONAL DATA ACCESS FOR VOLATILE MEMORY

BACKGROUND

At an architectural level, memory access is one-dimensional. Multiple arrays of memory cells are first strobed with a row address to select the same row in all of the arrays. The arrays are then strobed with a column address to select the column(s) of the arrays to read or write data from/to the appropriate memory locations. For multi-dimensional data, matrix data may be arranged in either row-major order or column-major order. For row-major order, the consecutive elements of a row reside next to each other in contiguous memory locations. For column-major order, the consecutive elements of a column reside next to each other in contiguous memory locations.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 is a block diagram of an apparatus according to an example;

FIG. 2 is a block diagram of a system according to an example;

FIGS. 3A to 3C are illustrative diagrams of an example of a method according to an example;

FIG. 8 is an illustrative diagram of a matrix-major data layout according to an example;

DETAILED DESCRIPTION

Figure 4A:
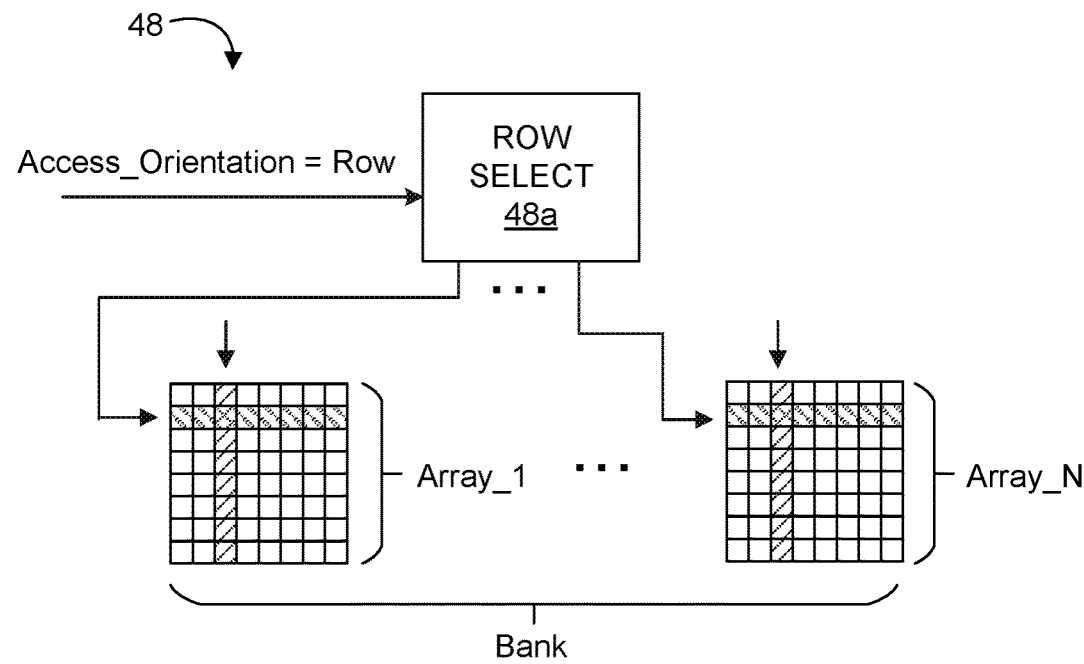
FIGS. 4A to 4B are illustrative diagrams of a memory device according to an example.

One or more examples or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, Field Programmable Gate Array (FPGA), firmware, driver, software, or any combination thereof. The material disclosed herein may also be implemented as instructions stored on a machine-readable medium, which may be read and executed by Moore Machine, Mealy Machine, and/or one or more processors. A machine-readable medium may include any medium and/or mechanism for storing or transmitting information in a form readable by a machine (e.g., a computing device). For example, a machine-readable medium may include read only memory (ROM); random access memory (RAM); Dynamic random-access memory (DRAM), magnetic disk storage media; optical storage media; nonvolatile (NV) memory devices; qubit solid-state quantum memory, electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every example may not necessarily include the particular feature, structure, or characteristic. Moreover, such phrases are not necessarily referring to the same implementation. Further, when a particular feature, structure, or characteristic is described in connection with an example, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4

(these standards are available at jedec.org). Such standards (and similar standards) may be referred to as DDR-based standards and communication interfaces of the storage devices that implement such standards may be referred to as DDR-based interfaces.

As matrix operations become increasingly important, some hardware development has focused on building dedicated matrix accelerators. A problem is that memories are designed for row-wise access. Such row-wise access often requires more data reads than needed by the application, artificially stressing the bandwidth. Some examples may address this problem by enabling both row-wise and column-wise data access. Advantageously, some examples may allow much more granular data accesses that may lead to lower overall bandwidth requirements. Examples of technology that provide both row-wise and column-wise data access may also advantageously provide a significant performance boost for columnar databases, and matrix operations.

With reference to FIG. 1, an example of an apparatus 10 may include memory 12 organized as at least one bank that includes two or more arrays, and circuitry 14 communicatively coupled to the memory 12 to select respective rows of the two or more arrays of a bank for a memory access operation based on an access orientation signal. In some examples, the circuitry 14 may be configured to select a same row of each of the two or more arrays of the bank for the memory access operation when the access orientation signal indicates a row orientation, and select a different row of each of the two or more arrays of the bank for the memory access operation when the access orientation signal indicates a column orientation. For example, the circuitry 14 may be configured to select a first row of a first array of the two or more arrays of the bank, and select a second row of a second array of the two or more arrays of the bank, where the first row is different from the second row when the access orientation signal indicates a column orientation.

In some examples, the circuitry 14 may be further configured to select the respective rows of the two or more arrays of the bank based on respective offsets in accordance with the access orientation signal. For example, the circuitry 14 may be configured to determine respective offsets for the two or more arrays of the bank in accordance with the access orientation signal, apply the determined respective offsets to a base row address to determine respective row addresses for the two or more arrays of the bank, and select the respective rows of the two or more arrays of the bank in accordance with the determined respective row addresses. In another example, the circuitry 14 may be configured to sum respective fixed offsets with a base row address in accordance with the access orientation signal to determine respective row addresses for the two or more arrays of the bank, and select the respective rows of the two or more arrays of the bank in accordance with the determined respective row addresses. In any of the examples described herein, the memory 12 may comprise embedded memory (e.g., embedded DRAM (eDRAM)).

Examples of the apparatus 10 may be coupled to a controller such as a general purpose controller, a special purpose controller, a memory controller, a storage controller, a micro-controller, an execution unit, etc. In some examples, the memory 12, the circuitry 14, and/or other system memory may be located in, or co-located with, various components, including a controller (e.g., on a same die or package substrate). In some examples, the controller may be configured as a memory controller and the memory 12 may be a connected memory device such as a memory module, a dual-inline memory module (DIMM), a memory node, etc. In another example, the controller may be configured as a memory controller and the memory 12 may be eDRAM.

Examples of each of the above memory 12 and circuitry 14, a suitable controller, and other apparatus components may be implemented in hardware, software, or any suitable combination thereof. For example, hardware implementations may include configurable logic, fixed-functionality logic, or any combination thereof. Examples of configurable logic include suitably configured programmable logic arrays (PLAs), FPGAs, complex programmable logic devices (CPLDs), and general purpose microprocessors. Examples of fixed-functionality logic include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

For example, the circuitry 14 may be implemented on a semiconductor apparatus, which may include one or more substrates, with the circuitry 14 coupled to the one or more substrates. In some examples, the circuitry 14 may be at least partly implemented in one or more of configurable logic and fixed-functionality hardware logic on semiconductor substrate(s) (e.g., silicon, sapphire, gallium-arsenide, etc.). For example, the circuitry 14 may include a transistor array and/or other integrated circuit components coupled to the substrate(s) with transistor channel regions that are positioned within the substrate(s). The interface between the circuitry 14 and the substrate(s) may not be an abrupt junction. The circuitry 14 may also be considered to include an epitaxial layer that is grown on an initial wafer of the substrate(s).

Alternatively, or additionally, all or portions of these components may be implemented in one or more modules as a set of logic instructions stored in a machine- or computer-readable storage medium such as RAM, ROM, programmable ROM (PROM), firmware, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages. For example, the memory 12, other persistent storage media, or other system memory may store a set of instructions (e.g., which may be firmware instructions) which when executed by a controller cause the apparatus 10 to implement one or more components, features, or aspects of the apparatus 10 (e.g., selecting respective rows of the two or more arrays of the bank for the memory access operation based on the access orientation signal, etc.).

With reference to FIG. 2, an example of a system 20 may include a processor 21, a memory device 22 organized as two or more banks with two or more arrays per bank, and a controller 23 communicatively coupled to the processor 21 and the memory device 22. For example, the memory device 22 and/or the controller 23 may include one or more features or aspects of the examples described herein. In particular, the memory device 22 may include circuitry to provide two-dimensional data access for the two or more banks of the memory device. In some examples, the circuitry of the memory device 22 may be configured to selectively perform a data access operation in one of a row-wise direction and a column-wise direction in accordance with an access orientation signal. For example, the circuitry of the memory device 22 may be further configured to generate respective offsets for row addresses of the two or more arrays in accordance with the access orientation signal. In another example, the circuitry of the memory device 22 may be further configured to sum a different fixed offset to a base row address for each array of the two or more arrays when the access orientation signal indicates a column orientation. In another example, the circuitry of the memory device 22 may be configured to generate a different row address for each array of the two or more arrays when the access orientation signal indicates a column orientation.

In some examples, the controller 23 may be configured to provide a column-wise burst read operation, and to transpose data from the two or more arrays after the column-wise burst read operation. In some examples, the system 20 may comprise a mobile computing device that may include any of a number of connected devices, peripherals, and/or components, such as at least one of a display 24*a* communicatively coupled to the processor 21, and a battery 24*b* coupled to the processor 21, etc. 15. In some examples, the processor 21, the memory device 22, and the controller 23 may all be integrated on a same integrated circuit die. In other examples, the processor 21, the memory device 22, and the controller 23 may all be integrated on a two or more integrated circuit die of a same multi-die package. In other examples, one or more of the processor 21, the memory device 22, and the controller 23 may be integrated on different integrated circuit die of different packages.

For example, the controller 23 may be configured as a memory controller. For example, the memory device 22 may be a connected memory device (e.g., a memory module, DIMM, a memory node, etc.). In another example, the memory device 22 may comprise embedded memory (e.g., eDRAM). Examples of the circuitry of the memory device 22 and the controller 23 may be implemented in a system, apparatus, computer, device, etc., for example, such as those described herein. More particularly, hardware implementations may include configurable logic (e.g., suitably configured PLAs, FPGAs, CPLDs, general purpose microprocessors, etc.), fixed-functionality logic (e.g., suitably configured ASICs, combinational logic circuits, sequential logic circuits, etc.), or any combination thereof. Alternatively, additionally, the circuitry of the memory device 22 and the controller 23 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

With reference to FIGS. 3A to 3C, an example of a method 25 may include controlling access to a memory device organized as two or more banks with two or more arrays per bank at box 26, and providing two-dimensional data access for the two or more banks of the memory device at box 27. For example, the method 25 may further include selecting respective rows of the two or more arrays of a bank for a memory access operation based on an access orientation signal at box 28. In some examples, the method 25 may include selecting a same row of each of the two or more arrays of the bank for the memory access operation when the access orientation signal indicates a row orientation at box 29, and selecting a different row of each of the two or more arrays of the bank for the memory access operation when the access orientation signal indicates a column orientation at box 30. For example, the method 25 may include selecting a first row of a first array of the two or more arrays of the bank at box 31, and selecting a second row of a second array of the two or more arrays of the bank, where the first row is different from the second row when the access orientation signal indicates a column orientation at box 32.

In some examples, the method 25 may additionally or alternatively include selecting the respective rows of the two or more arrays of the bank based on respective offsets in accordance with the access orientation signal at box 33. For example, the method 25 may include determining respective offsets for the two or more arrays of the bank in accordance with the access orientation signal at box 34, applying the determined respective offsets to a base row address to determine respective row addresses for the two or more arrays of the bank at box 35, and selecting the respective rows of the two or more arrays of the bank in accordance with the determined respective row addresses at box 36. In another example, the method 25 may include summing respective fixed offsets with a base row address in accordance with the access orientation signal to determine respective row addresses for the two or more arrays of the bank at box 37, and selecting the respective rows of the two or more arrays of the bank in accordance with the determined respective row addresses at box 38. In any of the examples herein, the memory device may comprise embedded memory, such as eDRAM at box 39.

In some examples, the method 25 may further include selectively performing a data access operation in one of a row-wise direction and a column-wise direction in accordance with an access orientation signal at box 40. For example, the method 25 may include generating respective offsets for row addresses of the two or more arrays in accordance with the access orientation signal at box 41. In another example, the method 25 may include summing a different fixed offset to a base row address for each array of the two or more arrays when the access orientation signal indicates a column orientation at box 42. In another example, the method 25 may include generating a different row address for each array of the two or more arrays when the access orientation signal indicates a column orientation at box 43. In some examples, the method 25 may further include providing a column-wise burst read operation at box 44, and transposing data from the two or more arrays after the column-wise burst read operation at box 45. In some examples, the method 25 may further include laying out data in the memory device in a matrix-major format at box 46 (e.g., as described in more detail below).

Examples of the method 25 may be implemented in a system, apparatus, computer, device, etc., for example, such as those described herein. More particularly, hardware implementations may include configurable logic (e.g., suitably configured PLAs, FPGAs, CPLDs, general purpose microprocessors, etc.), fixed-functionality logic (e.g., suitably configured ASICs, combinational logic circuits, sequential logic circuits, etc.), or any combination thereof. Hybrid hardware implementations include static dynamic System-on-Chip (SoC) re-configurable devices such that control flow, and data paths implement logic for the functionality. Alternatively, or additionally, the method 25 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the method 25 may be implemented on a computer readable medium. Examples or portions of the method 25 may be implemented in firmware, applications (e.g., through an application programming interface (API)), or driver software running on an OS. Additionally, logic instructions might include assembler instructions, instruction set architecture (ISA) instructions, data set architecture (DSA) commands, (machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, Moore Machine, Mealy Machine, etc.).

CMOS technology scaling may drive higher levels of integration in VLSI design, which may add more compute engines on a die. To meet some performance-scaling needs, high-speed and high-bandwidth memory may be utilized. Some systems may include on-die SRAM. To meet the demands of bandwidth-intense applications, some systems may additionally or alternatively include eDRAM for high-performance and density needs in memory. Suitable eDRAM technology may enable the integration of an eDRAM cell into the logic technology platform. An example processor may include a CPU connected to a one gigabyte (1 GB) eDRAM die through on-package-IO (OPIO). For example, INTEL's IRIS GRAPHICS PRO may be implemented as a multi-chip-package (MCP) product that uses eDRAM as L4 cache and provides low-power high-bandwidth memory access to meet high-performance graphics segment needs.

An example eDRAM may have a 256 Kb-subarray architecture. The array may have an open-bitline architecture with 128+ cells on each side, including redundant rows. Similarly, each wordline may have a total of 1024+ columns, including redundant columns. The subarray reads or writes 128+ bits and each bit-slice contains its own set of half-VCC local bitline precharge circuitry, sense amplifier, and 8:1 column mux. Subarrays may also contain local half-VCC generators, that are programmable for optimal sensing margin. Four bitcell operations may include sense, write-back, wordline-turn-off and local bitline precharge. An example configuration may include a data-path for read, write and refresh operations. An example chip may contain 128 independent banks for read and write and 64 bank-groups for refresh, where a bank random cycle time (RCT) is equal to six array clock cycles. By providing a large number of banks and short RCT, bank conflict may be reduced or minimized for high-bandwidth random accesses and increased or maximized performance. Four vertical 256 Mb quarters may be activated simultaneously during each operation, where each bank reads out 64×2 bits in two consecutive cycles after column and row repairs to get 512b-wide word size. The OPIO may be clocked at twice the array frequency and double data-rate to meet area and bandwidth requirements.

The array has separate data buses for read and write operations but shares a common address bus, hence, it supports read and write operations in alternating array clock cycles to different banks. The refresh operation can occur during a read or write since it has a separate refresh bank-group address. There are two copies of charge pumps and regulators, each supporting the top or bottom 512 Mb. An example chip may also contain fuses, programmable built-in self test (PBIST), a test access port (TAP) and a digital thermal sensor (DTS).

Some examples may provide technology for row and column read in eDRAM. Some examples provide an eDRAM bank architecture that allows the data stored in the eDRAM to be read in both a row-wise and column-wise direction. Some examples may further provide a matrix-major data layout that allows data to be stored in a two-dimensional-aware manner Advantageously, some examples may enable faster matrix operations. In some examples, two-dimensional data access may significantly reduce bandwidth requirements for a data intensive workload. For example, technology described herein to selectively read row and column data may substantially improve the performance of a wide variety of in-memory databases (e.g., such as may be utilized by deep learning applications), because the extra data movement between memory and host may be reduced or minimized.

In some examples, memory banks and data access circuitry may be configured to enable column read in an eDRAM. Examples may further include a matrix-major data layout to improve or optimize memory access operations for matrix data. In some examples, a controller may also be configured allow the use of features or aspects of the two-dimensional data access described herein.

Figure 4B:
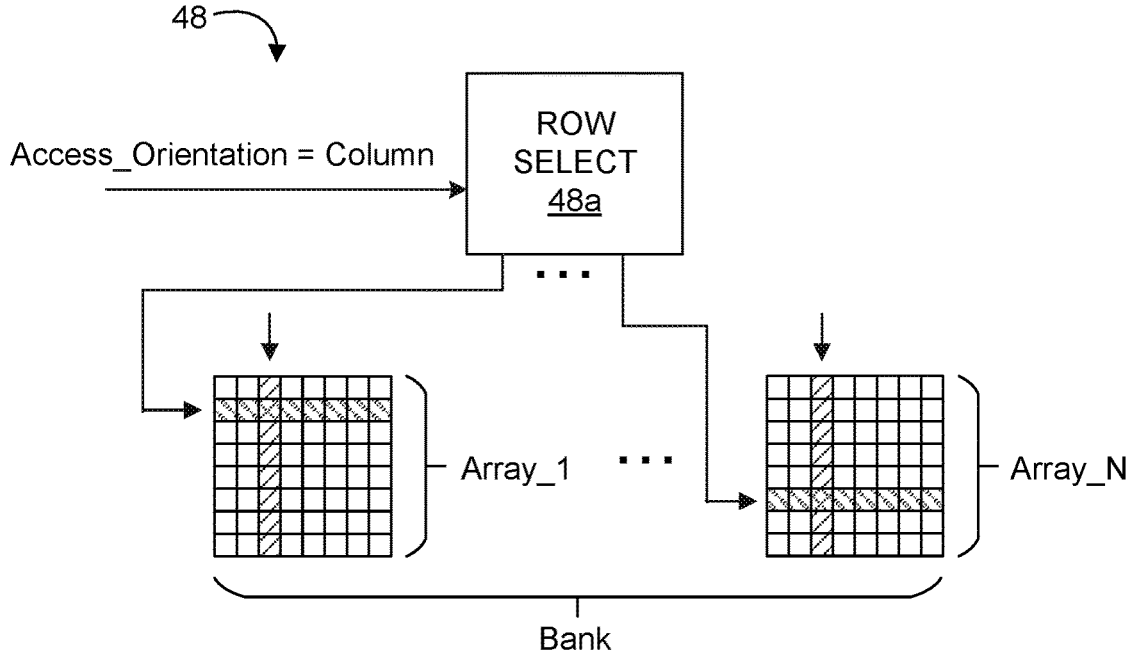

With reference to FIGS. 4A and 4B, an example memory device 48 (e.g., a memory die/chiplet/dielet, on-die memory, a memory IP block, eDRAM, etc.) includes a row select circuit 48a coupled to N arrays (e.g., Array_1 through Array_N, where N>1) of a bank of the memory device 48. In this example architecture, the bank may consist of N arrays connected in parallel. Each array provides one (1) bit of data per read command and per burst. In this example architecture, all of the arrays are connected in series. In operation, first a row address is strobed to all of the arrays, and the data is latched in respective sense amplifiers. Next, the same column address is strobed to output one (1) bit per array (e.g., the bit indicated by the cross hatch pattern at the intersection of the strobed row and column) Accordingly, in this example, one (1) bit is read for each of N arrays (e.g., totaling one (1) byte where N=eight (8)). In terms of data layout, for N=8, a suitable access pattern may involve each byte of data being split across each array so that one byte can be read per read command.

In a convention memory architecture, the identical row address is always provided to each array (e.g., row-wise access only). As shown in FIGS. 4A and 4B, the row select circuit 48a is configured to provide two-dimensional data access to the arrays based on an access orientation signal. The row select circuit 48a is configured to select the same row in each of the arrays when the access orientation signal indicates row-wise data access (e.g., see FIG. 4A). The row select circuit 48a is further configured to select a different row in each of the arrays when the access orientation signal indicates column-wise data access (e.g., see FIG. 4B).

Figure 4C:
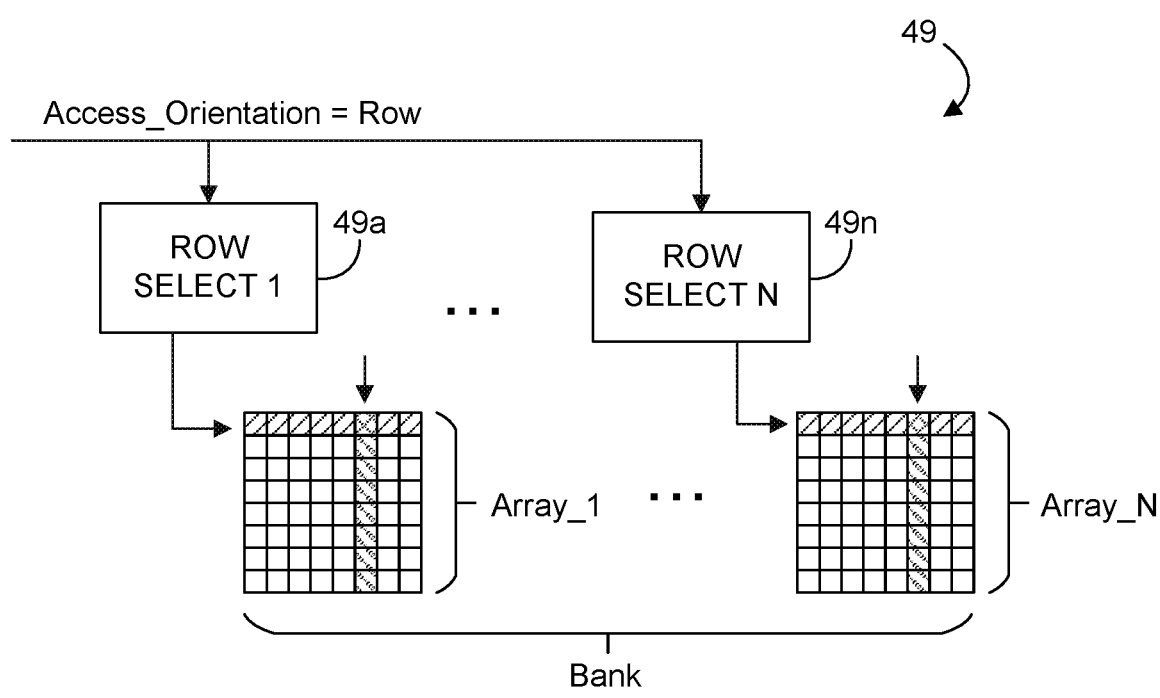
FIGS. 4C to 4D are illustrative diagrams of another memory device according to an example.
Figure 4D:
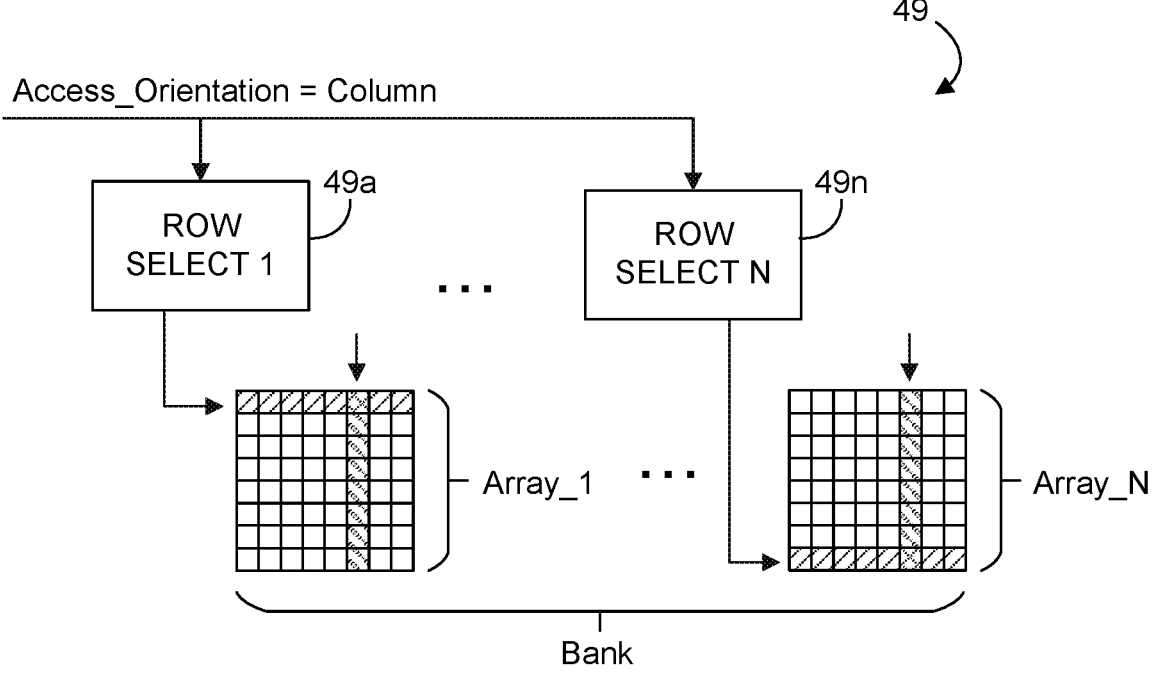

With reference to FIGS. 4C and 4D, another example memory device 49 (e.g., a memory die/chiplet/dielet, on-die memory, a memory IP block, eDRAM, etc.) includes N row select circuits 49a through 49n respectively coupled to N arrays (e.g., Array_1 through Array_N, where N>1) of a bank of the memory device 49. As shown in FIGS. 4C and 4D, the row select circuits 49a though 49n are configured to provide two-dimensional data access to the arrays based on an access orientation signal. The row select circuits 49a through 49n are configured to select the same row in each of the arrays when the access orientation signal indicates row-wise data access (e.g., see FIG. 4C). The row select circuits 49a through 49n are further configured to select a different row in each of the arrays when the access orientation signal indicates column-wise data access (e.g., see FIG. 4D).

Figure 5A:
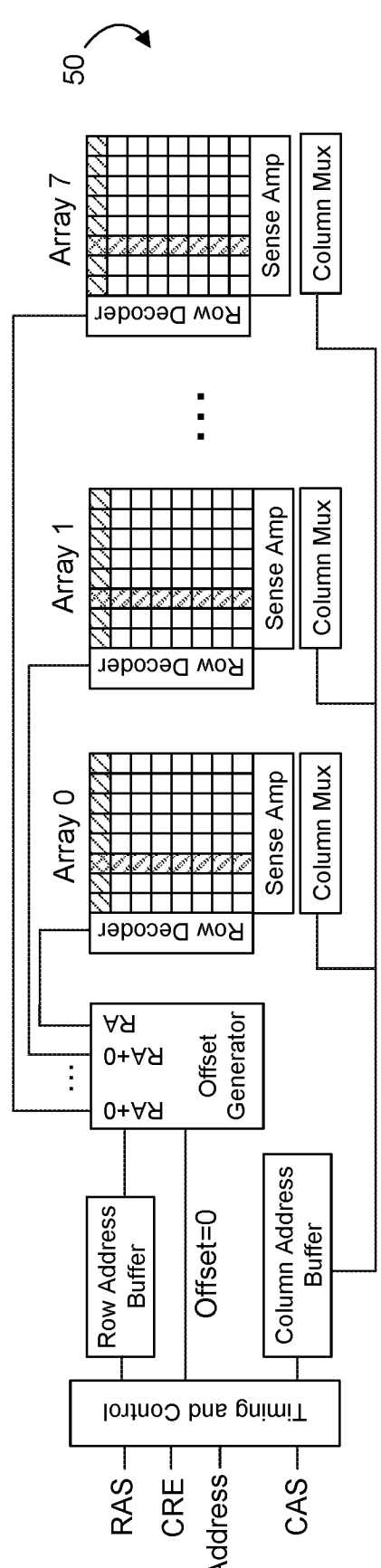
FIGS. 5A to 5B are illustrative diagrams of another memory device according to an example.
Figure 5B:
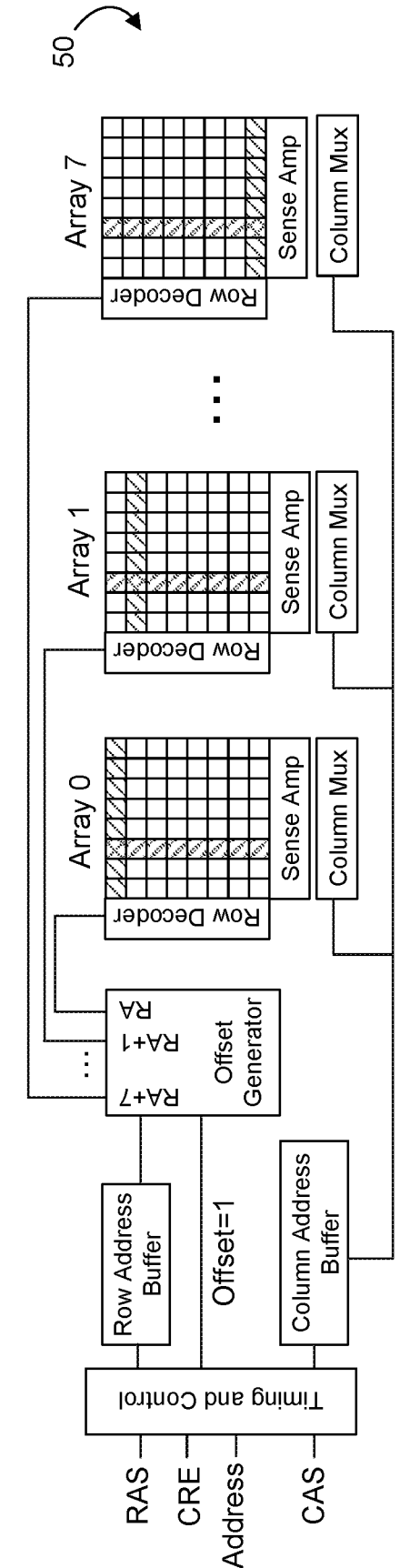

Any suitable technology may be utilized to implement a row address offset generator depending, for example, on the power performance area (PPA) characteristics of the underlying process technology. In one example, row selection may be implemented with an array offset circuit. With reference to FIGS. 5A and 5B, another example memory device 50 includes two or more banks of eight (8) arrays of memory cells (Array 0 through Array 7) per bank. Each array includes row decoder circuitry, sense amplifier amp circuitry, and column multiplexer (mux) circuitry. Any suitable memory technology may be utilized for the arrays, the row decoders, the sense amps, and the column muxes. The device 50 further includes timing and control circuitry, a row address buffer, a column address buffer, and an offset generator circuit, coupled as shown. The timing and control circuitry may be responsive to a read address strobe (RAS) signal, a column read enable (CRE) signal, a column address strobe (CAS) signal, and an address to perform memory access operations for the arrays.

Each bank of the memory device 50 may include respective offset generator circuitry enabled by respective CRE signals. The offset generator circuitry generates a separate row address for each array. When the CRE signal indicates that column read is disabled (e.g., data access is row-wise), the offset may be zero (0) such that the row address for each array is the same (e.g., see FIG. 5A). When the CRE signal indicates that column read is enabled (e.g., data access is column-wise), the offset may be one (1) such that the row address of neighboring arrays is offset by one (1) (e.g., see FIG. 5B). The different row addresses generated when column read is enabled open a different row in each array inside a bank. In this example, the offset generation may be summarized as RowAddress(Array_N)=mod(RowAddress+Array_ID, N_rows). The modulo operation may be utilized to ensure that the row address offset wraps back to zero (0) when the address reaches the end of the array. With the offset mechanism of the memory device 50, eight (8) bits may be read in a column-wise (e.g. vertical) direction from each bank.

Figures 6A, 6B:
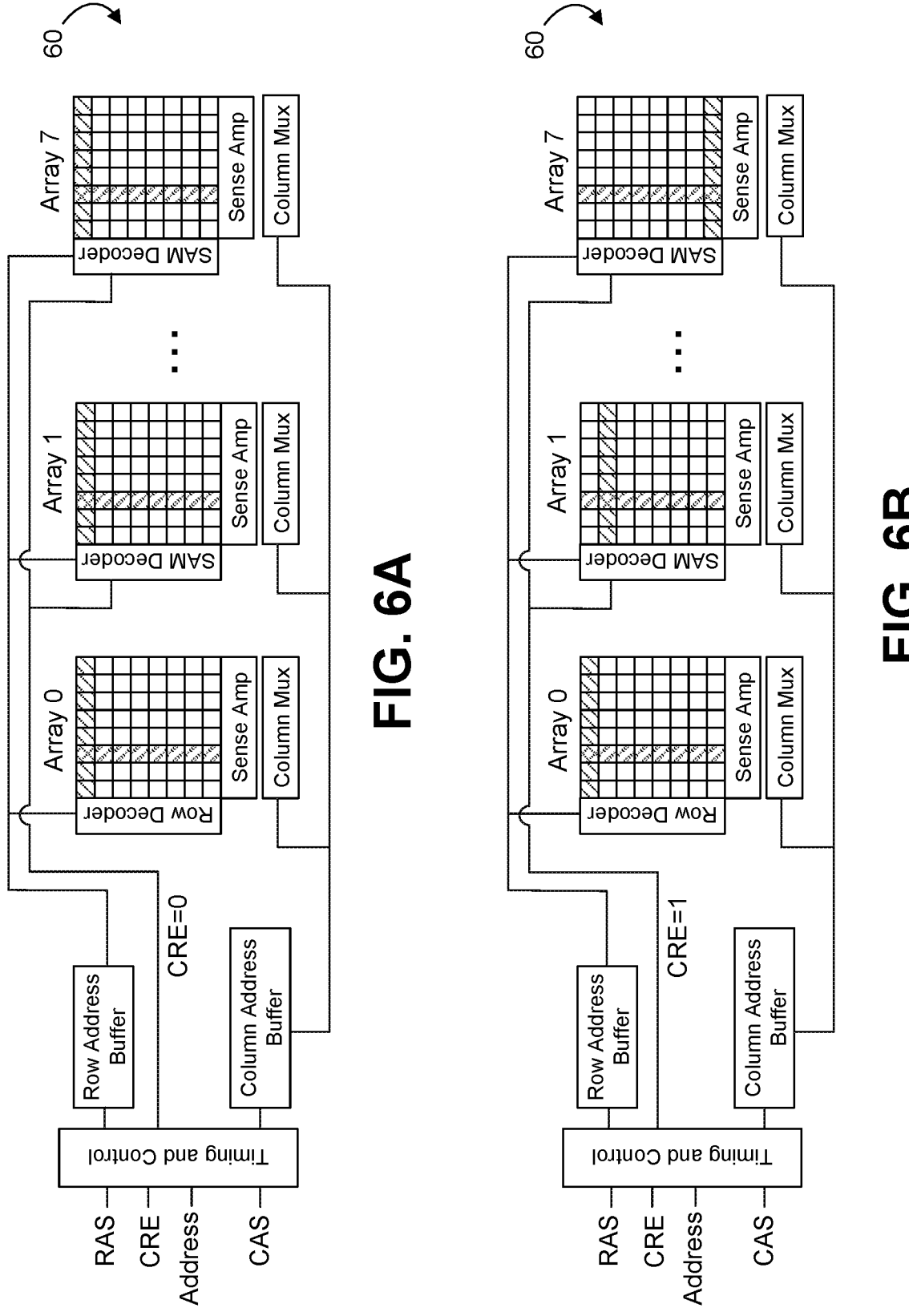
FIGS. 6A to 6B are illustrative diagrams of another memory device according to an example.

In another example, a sum addressed memory (SAM) row decoder may be utilized to select the row of the array, with a fixed offset for each array. With reference to FIGS. 6A and 6B, another example memory device 60 may include similar components as the memory device 50, but SAM decoders are utilized for Array 1 through Array 7 to generate the appropriate offsets for those arrays. In this example, the offsets for each array are hardcoded. Accordingly, only the row and the CRE signal is propagated to each decoder. The SAM decoders are configured to decode the row address with no summed component for row-wise data access when CRE=0 (e.g., see FIG. 6A) and to decode the row address summed with a fixed offset amount (e.g., the appropriate offset is respectively hardcoded in each SAM decoder) for column-wise data access when CRE=1 (e.g., see FIG. 6B).

Burst Length And Data Reshaping Examples

Figure 7A:
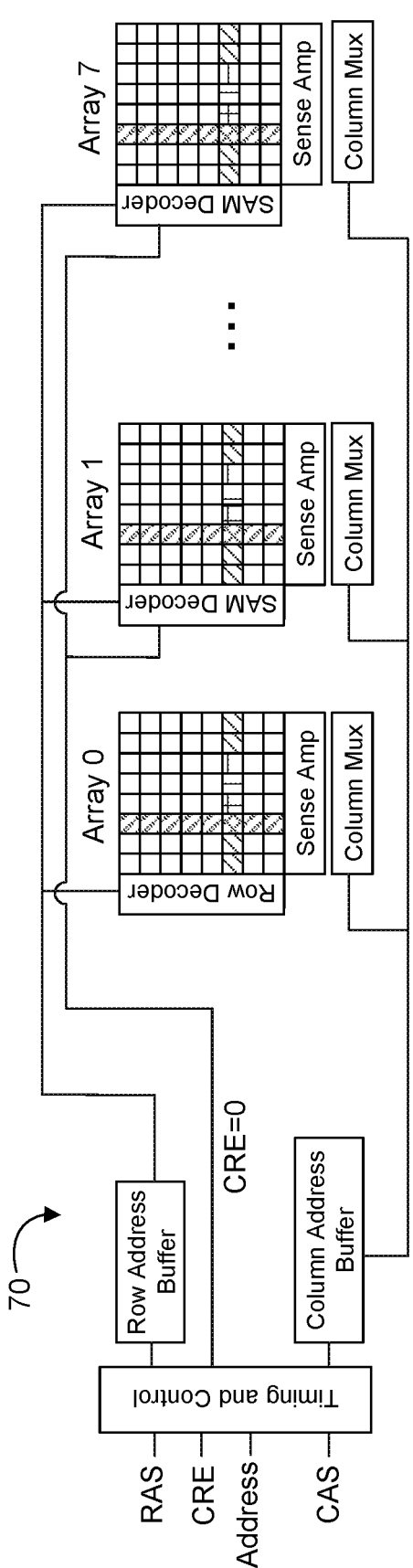
FIGS. 7A to 7D are illustrative diagrams of a burst operation for a memory device according to an example.
Figure 7B:
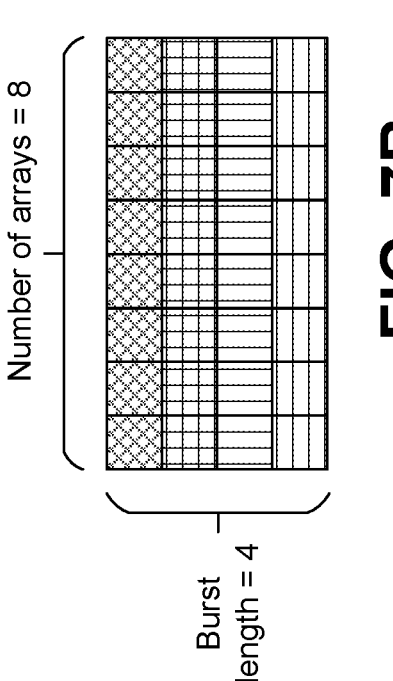

In some systems with eDRAM, the data may be read in bursts to maximize the bus utilization. With reference to FIGS. 7A to 7D, another example memory device 70 may be similarly configured as the memory device 60, and further configured for both row-wise and column wise burst operations. FIGS. 7A and 7B illustrate a row-wise burst operation (e.g., when CRE=0) where as soon as the row and column addresses are strobed, the next three (3) columns in the same row are also read out (e.g., a burst length of four (4) in this example). The burst operation is efficient because the entire row of data may be latched into the sense amps already after first eight (8) bits are read. As a result, four (4) bytes of data (e.g., with one (1) bit from each array) may be read at once when the burst is complete (e.g., the first byte consists of (Row_X, Col_Y) from (Array_0, Array_1, . . . , Array_7), the second byte consists of (Row_X, Col_(Y+1)) from the same eight arrays, and so on). Consequently, the byte addressed data may be stored by striping each byte across eight arrays of a bank. The host may then receive four consecutive bytes per read instruction.

Figures 7C, 7D:
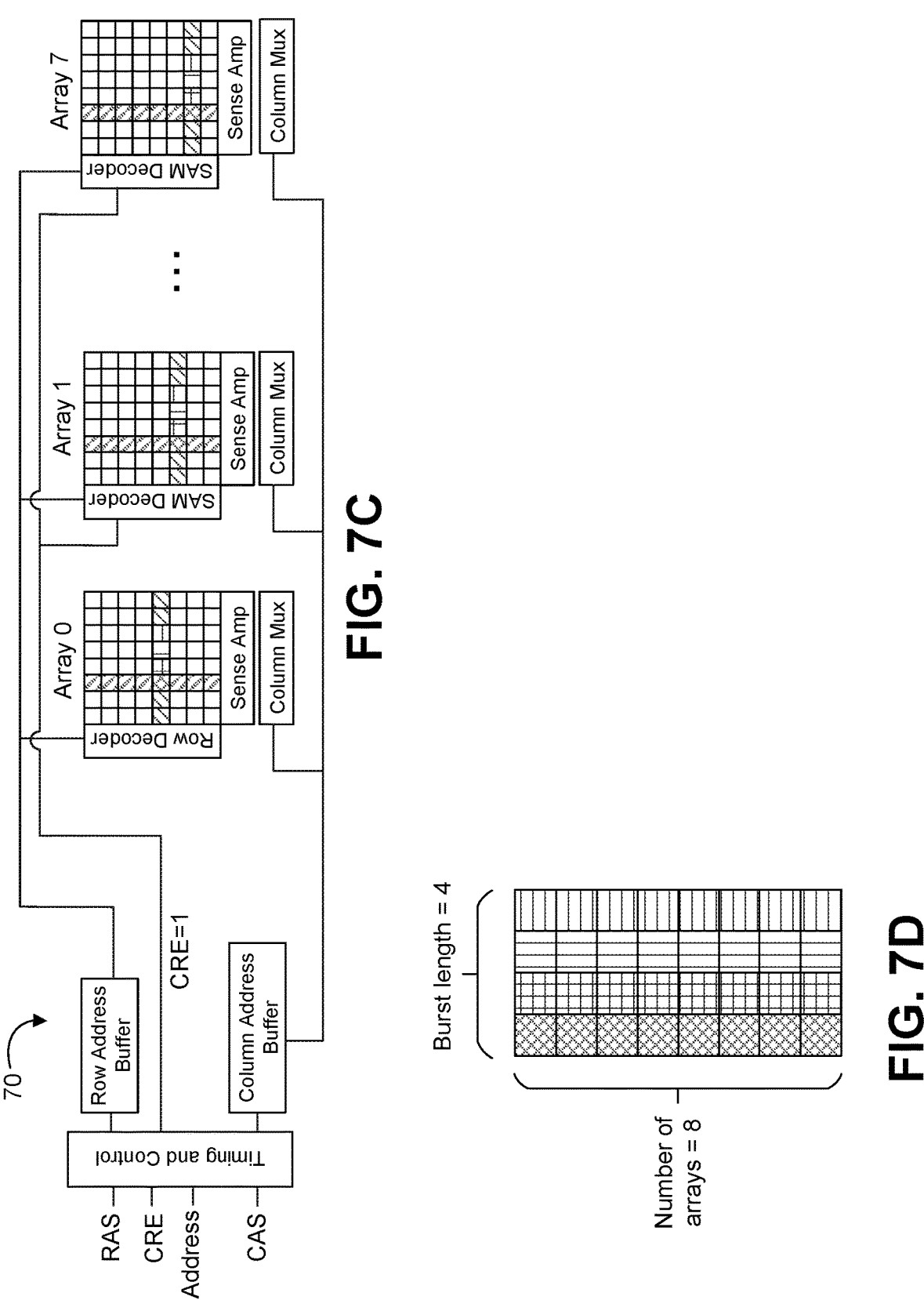

FIGS. 7C and 7D illustrate a column-wise burst operation (e.g., when CRE=1) where as soon as the row and column addresses are strobed, the next three (3) columns in different rows are also read out (e.g., a burst length of four (4) in this example). The data output of the bank changes because the data is read in the vertical direction. In the illustrated example, the data output in a column-wise read operation includes the first four (4) bits of each byte in the vertical direction. As shown in FIGS. 7C and 7D, the first read will output first bit of bytes stored at Col_Y and ((Row_X, Array_0), (Row_(X+1), Array_1), . . . , (Row_(X+7), Array_7)), then the second bit of each byte stored at Col_(Y+1) and ((Row_X, Array_0), (Row_(X+1), Array_1), . . . , (Row_(X+7), Array_7)), and so on. In this example, eight (8) nibbles are output in the column direction per bank (e.g., see FIG. 7D). The controller may transpose the data before sending the data to the host to ensure that the is interpreted correctly by the host.

In some examples, for a bank architecture with burst length BL, and number of arrays N_A, the data output of a row-wise read operation may be N_BL blocks of data each N_A bits wide in the row direction. And, for a column-wise read operation, the data output may be N_A blocks of data each N_BL bits wide in the column direction. To ensure byte level data granularity, the number of arrays and the burst length may be chosen in multiples of eight.

Bank Interleaving Examples

An example bank interleaving technique that allows the bandwidth of the eDRAM system to be maximized may be utilized directly for column read as well. The banks of the eDRAM may be independently addressed. Accordingly, a column or row operation may be started on a next bank while a current bank is busy. Such bank interleaving may allow for a fine-grained data access pattern that may benefit a wide variety of applications.

Column Write Examples

The above-described functionality may be directly applied for column writes as well as column reads. With suitable shaping of the input data by the controller (e.g., as illustrated in FIG. 7D), the process of row precharge and column select can remain the same. Then, using the write enable, the data may be written column-wise in the selected addresses. Advantageously, examples may allow highly granular control of data modification.

Matrix-Major Data Layout Examples

In some examples, data may be laid out in a format (referred to herein as a matrix-major format) that better utilizes the column-read/write technology of the various examples described and the finer granularity data access provided thereby. For a conventional memory, because of row-wise only operation, a choice may be made between row-major or column-major format for storing matrices. In a row-major layout, the rows are striped across banks. In a column-major layout, the columns are striped across banks. A problem is that column-wise access of data in row-major format and row-wise access of data in column-major format is penalized, because the same bank may be accessed multiple times to retrieve/store the data.

Figure 8:
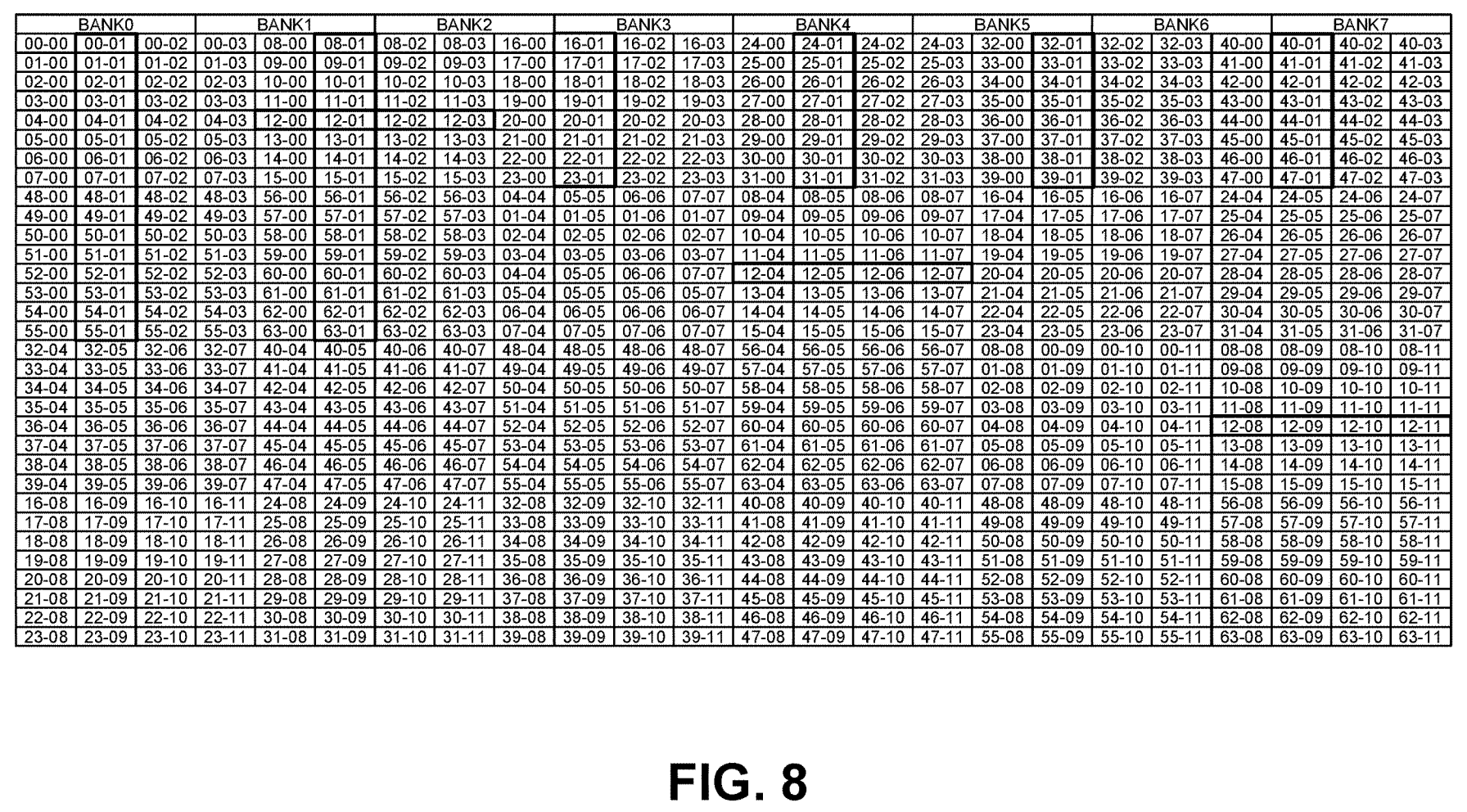

Some examples of a column-read enabled memory may overcome this limitation of choosing the row/column-major layout for matrix data and instead use a matrix-major layout. FIG. 8 shows an example sixty-four by twelve (64×12) matrix laid out using an example matrix-major format. As illustrated in FIG. 8, the first number in a box indicates a row of the matrix data and the second number indicates a column of the matrix data (e.g., "12-05" indicates a matrix data element at Row 17 and Column 5). By enabling column-read (e.g., CRE=1), column one (e.g., highlighted in FIG. 8 with a thicker line) may be read with striping across multiple banks to get full bandwidth. Similarly for row reads (e.g., row 12 in FIG. 8 is also highlighted with a thicker line), the rows can be striped across banks to read row-wise. In some examples, a suitable matrix-major layout combined with a memory device with column-read technology allows true two-dimensional access to matrix data, that is much finer grained as compared to a conventional row-major or column-major layout in a conventional memory device.

In some examples, the matrix-major layout may be exposed to a software layer so that the software can take full advantage of two-dimensional access to matrix data. For many applications, the ability to read and write in two dimensions may significantly improve the applications' performance. In some examples, the software may designate a given matrix to be stored in matrix-major format. The designation may then be propagated to the controller. After the mapping is complete, the software may access the matrix data in true two-dimensional fashion.

Refresh Examples

In some examples, the row selection circuitry, offset generation circuitry, SAM decoder circuitry, etc. may be implemented at a subarray level such that the row access mechanism is preserved. Any suitable techniques may be utilized for refresh logic and circuitry without impact from the various examples described herein.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 9:
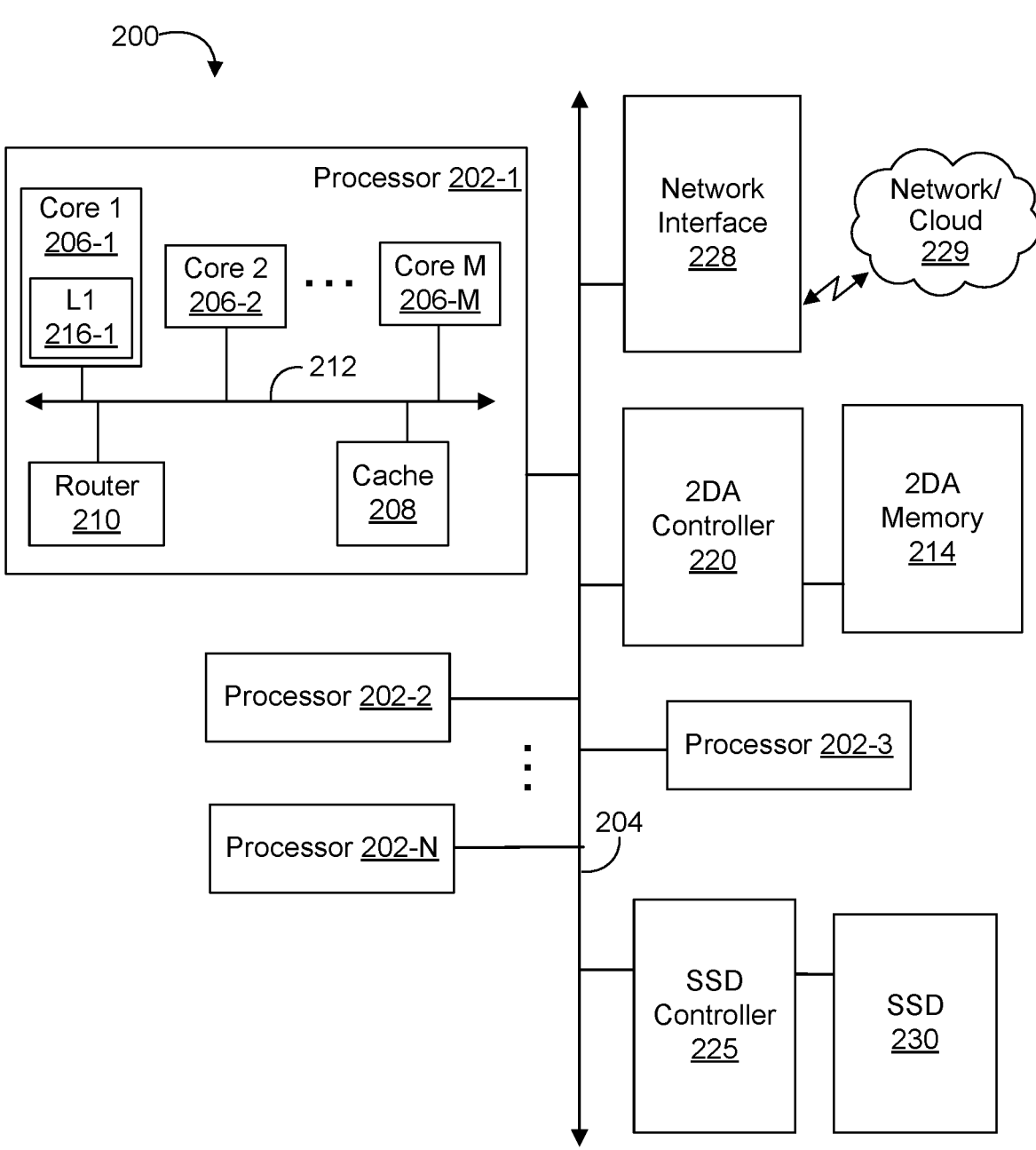
FIG. 9 is a block diagram of an example of a computing system according to an example.

Turning now to FIG. 9, an example of a computing system 200 may include one or more processors 202-1 through 202-N (generally referred to herein as "processors 202" or "processor 202"). The processors 202 may communicate via an interconnection or bus 204. Each processor 202 may include various components some of which are only discussed with reference to processor 202-1 for clarity. Accordingly, each of the remaining processors 202-2 through 202-N may include the same or similar components discussed with reference to the processor 202-1.

In some examples, the processor 202-1 may include one or more processor cores 206-1 through 206-M (referred to herein as "cores 206," or more generally as "core 206"), a cache 208 (which may be a shared cache or a private cache in various examples), and/or a router 210. The processor cores 206 may be implemented on a single integrated circuit (IC) chip. Moreover, the chip may include one or more shared and/or private caches (such as cache 208), buses or interconnections (such as a bus or interconnection 212), memory controllers, or other components.

In some examples, the router 210 may be used to communicate between various components of the processor 202-1 and/or system 200. Moreover, the processor 202-1 may include more than one router 210. Furthermore, the multitude of routers 210 may be in communication to enable data routing between various components inside or outside of the processor 202-1.

The cache 208 may store data (e.g., including instructions) that is utilized by one or more components of the processor 202-1, such as the cores 206. For example, the cache 208 may locally cache data stored in a two-dimensional access (2DA) memory 214 for faster access by the components of the processor 202. As shown in FIG. 9, the 2DA memory 214 may be in communication with the processors 202 via the interconnection 204. In some examples, the cache 208 (that may be shared) may have various levels, for example, the cache 208 may be a mid-level cache and/or a last-level cache (LLC). Also, each of the cores 206 may include a level 1 (L1) cache (216-1) (generally referred to herein as "L1 cache 216"). Various components of the processor 202-1 may communicate with the cache 208 directly, through a bus (e.g., the bus 212), and/or a memory controller or hub.

As shown in FIG. 9, the 2DA memory 214 may be coupled to other components of system 200 through a 2DA controller 220. the 2DA memory 214 may include volatile memory and may be interchangeably referred to as main memory or system memory. Even though the 2DA controller 220 is shown to be coupled between the interconnection 204 and the 2DA memory 214, the 2DA controller 220 may be located elsewhere in system 200. For example, the 2DA controller 220 or portions of it may be provided within one of the processors 202 in some examples. For example, the 2DA memory 214 may include embedded memory such as eDRAM.

The system 200 may communicate with other devices/systems/networks via a network interface 228 (e.g., which is in communication with a computer network and/or the cloud 229 via a wired or wireless interface). For example, the network interface 228 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 229.

System 200 may also include nonvolatile memory such as a solid-state drive (SSD) 230 coupled to the interconnect 204 via SSD controller 225. Hence, SSD controller 225 may control access by various components of system 200 to the SSD 230. Furthermore, even though SSD controller 225 is shown to be directly coupled to the interconnection 204 in FIG. 9, SSD controller 225 can alternatively communicate via a memory/storage bus/interconnect (such as the SATA (Serial Advanced Technology Attachment) bus, Peripheral Component Interconnect (PCI) (or PCI EXPRESS (PCIe) interface), NVM EXPRESS (NVMe), Serial Attached SCSI (SAS), Fiber Channel, etc.) with one or more other components of system 200 (for example where the memory bus is coupled to interconnect 204 via some other logic like a bus bridge, chipset, etc.) Additionally, SSD controller 225 may be incorporated into memory controller logic or provided on a same integrated circuit (IC) device in various examples (e.g., on the same circuit board device as SSD 230 or in the same enclosure as SSD 230).

Furthermore, the 2DA memory 214, the 2DA controller 220, the SSD controller 225 and/or the SSD 230 may be coupled to one or more sensors (not shown) to receive information (e.g., in the form of one or more bits or signals) to indicate the status of or values detected by the one or more sensors. These sensor(s) may be provided proximate to components of system 200 (or other computing systems discussed herein), including the cores 206, interconnections 204 or 212, components outside of the processor 202, the 2DA memory 214, the 2DA controller 220, the SSD 230, SSD bus, SATA bus, the SSD controller 225, etc., to sense variations in various factors affecting power/thermal behavior of the system/platform, such as temperature, operating frequency, operating voltage, power consumption, and/or inter-core communication activity, etc.

The 2DA memory 214 includes technology as described herein to provide two-dimensional to data stored therein. For example, the 2DA memory 214 may include multiple banks with multiple arrays of memory cells per bank. In some examples, the circuitry of the 2DA memory 214 may be configured to selectively perform a read or write memory operation in either a row-wise direction or a column-wise direction in accordance with an access orientation signal. In some examples, the circuitry of the 2DA memory 214 may be configured to generate respective offsets for row addresses of the arrays in accordance with the access orientation signal. In other examples, the circuitry of the 2DA memory 214 may be configured to sum a different fixed offset to a base row address for each array when the access orientation signal indicates a column orientation. In another example, the circuitry of the 2DA memory 214 may be configured to generate a different row address for each array when the access orientation signal indicates a column orientation. In some examples, the 2DA controller 220 may be configured to provide a column-wise burst read operation, and to transpose data from the two or more arrays after the column-wise burst read operation. The 2DA controller 220 may also be configured to implement other aspects of the technology described herein (e.g., interaction with a host/software, sending 2DA instructions to the 2DA memory 214, mapping a matrix-major data layout, etc.).

Figure 10:
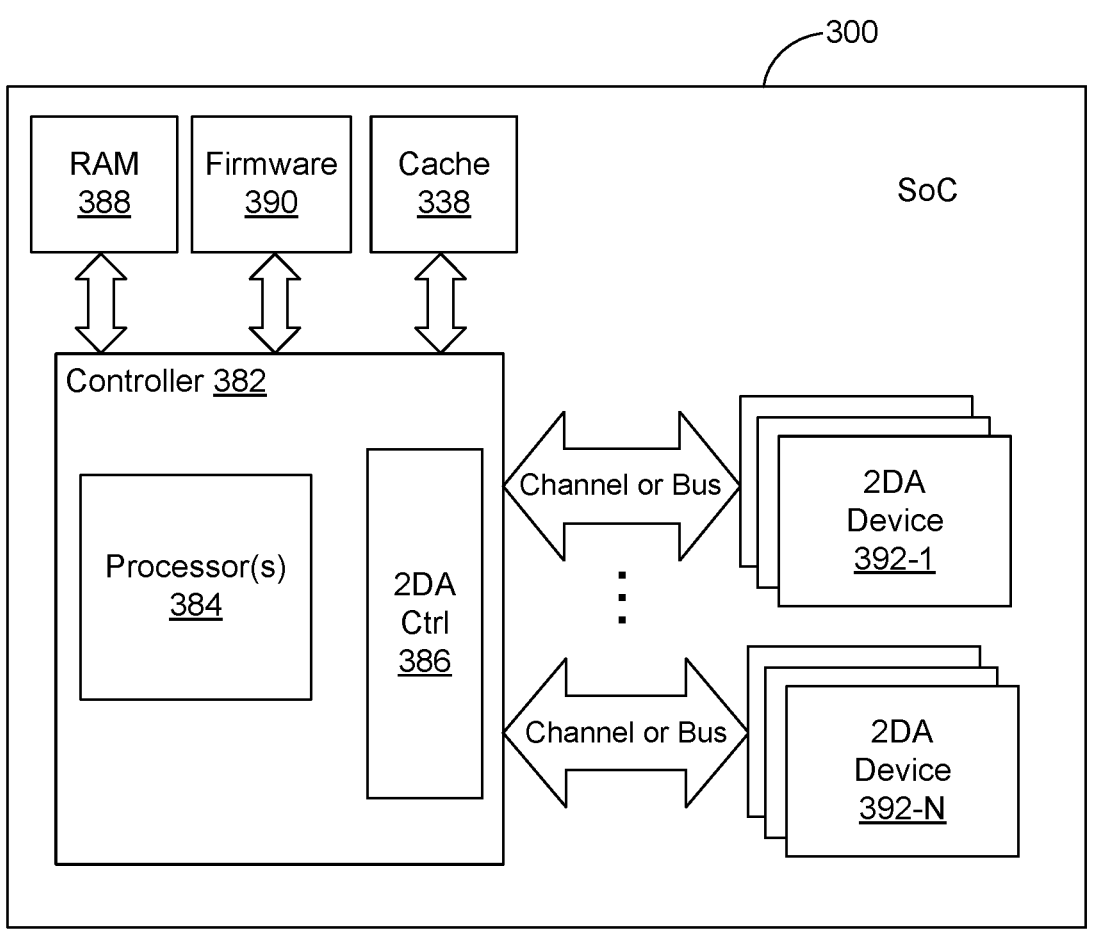
FIG. 10 is a block diagram of an example of a system-on-a-chip (SOC) according to an example.

FIG. 10 illustrates a block diagram of various components of a SOC 300, according to an example. As illustrated in FIG. 10, the SOC 300 includes a controller 382 (which in turn includes one or more processor cores or processors 384 and 2DA controller 386), cache 338, RAM 388, firmware storage 390, and one or more 2DA memory dice 392-1 to 392-N (collectively 2DA media 392). The 2DA media 392 is coupled to the 2DA controller 386 via one or more memory channels or busses. Processors 384 and/or controller 382 may compress/decompress data written to or read from 2DA memory dice 392-1 to 392-N.

One or more of the features/aspects/operations discussed with reference to FIGS. 1-8 may be performed by one or more of the components of FIG. 10. Also, one or more of the features/aspects/operations of FIGS. 1-8 may be programmed into the firmware 390. Advantageously, the 2DA controller 386, the 2DA media 392, and/or other components of the SOC 300 may include technology to implement one or more aspects of the apparatus 10 (FIG. 1), the system 20 (FIG. 2), the method 25 (FIGS. 3A to 3C), the device 48 (FIGS. 4A, 4B), the device 49 (FIGS. 4C, 4D), the device 50 (FIGS. 5A, 5B), the device 60 (FIGS. 6A, 6B), the device 70 (FIGS. 7A to 7D), the matrix-major data layout (FIG. 8), and/or any of the features discussed herein.

The 2DA controller 386 may be configured to provide two-dimensional to data stored in the 2DA media 392. In some examples, the 2D media 392 may be organized as multiple banks with multiple arrays of memory cells per bank. The 2DA controller 386 may be configured to select respective rows of the arrays of a bank for a memory access operation based on an access orientation signal. In some examples, the 2DA controller 386 may be configured to select a same row of each of the arrays of the bank for the memory access operation when the access orientation signal indicates a row orientation, and select a different row of each of the arrays of the bank for the memory access operation when the access orientation signal indicates a column orientation. For example, the 2DA controller 386 may be configured to select a first row of a first array of the bank, and select a second row of a second array of the bank, where the first row is different from the second row when the access orientation signal indicates a column orientation.

In some examples, the 2DA controller 386 may be further configured to select the respective rows of the arrays of the bank based on respective offsets in accordance with the access orientation signal. For example, the 2DA controller 386 may be configured to determine respective offsets for the arrays of the bank in accordance with the access orientation signal, apply the determined respective offsets to a base row address to determine respective row addresses for the arrays of the bank, and select the respective rows of the arrays of the bank in accordance with the determined respective row addresses. In another example, the 2DA controller 386 may be configured to sum respective fixed offsets with a base row address in accordance with the access orientation signal to determine respective row addresses for the arrays of the bank, and select the respective rows of the arrays of the bank in accordance with the determined respective row addresses. In any of the examples described herein, the 2DA media may comprise embedded memory such as eDRAM.

Additional Notes and Examples

Example 1 includes an apparatus, comprising memory organized as at least one bank that includes two or more arrays, and circuitry communicatively coupled to the memory to select respective rows of the two or more arrays of a bank for a memory access operation based on an access orientation signal.

Example 2 includes the apparatus of Example 1, wherein the circuitry is further to select a same row of each of the two or more arrays of the bank for the memory access operation when the access orientation signal indicates a row orientation, and select a different row of each of the two or more arrays of the bank for the memory access operation when the access orientation signal indicates a column orientation.

Example 3 includes the apparatus of Example 1, wherein the circuitry is further to select a first row of a first array of the two or more arrays of the bank, and select a second row of a second array of the two or more arrays of the bank, wherein the first row is different from the second row when the access orientation signal indicates a column orientation.

Example 4 includes the apparatus of any of Examples 1 to 3, wherein the circuitry is further to select the respective rows of the two or more arrays of the bank based on respective offsets in accordance with the access orientation signal.

Example 5 includes the apparatus of Example 1, wherein the circuitry is further to determine respective offsets for the two or more arrays of the bank in accordance with the access orientation signal, apply the determined respective offsets to a base row address to determine respective row addresses for the two or more arrays of the bank, and select the respective rows of the two or more arrays of the bank in accordance with the determined respective row addresses.

Example 6 includes the apparatus of Example 1, wherein the circuitry is further to sum respective fixed offsets with a base row address in accordance with the access orientation signal to determine respective row addresses for the two or more arrays of the bank, and select the respective rows of the two or more arrays of the bank in accordance with the determined respective row addresses.

Example 7 includes the apparatus of any of Examples 1 to 6, wherein the memory comprises embedded memory.

Example 8 includes a system, comprising a processor, and a memory device organized as two or more banks with two or more arrays per bank, and a controller communicatively coupled to the processor and the memory device, the memory device including circuitry to provide two-dimensional data access for the two or more banks of the memory device.

Example 9 includes the system of Example 8, wherein the circuitry is further to selectively perform a data access operation in one of a row-wise direction and a column-wise direction in accordance with an access orientation signal.

Example 10 includes the system of Example 9, wherein the circuitry is further to generate respective offsets for row addresses of the two or more arrays in accordance with the access orientation signal.

Example 11 includes the system of Example 9, wherein the circuitry is further to sum a different fixed offset to a base row address for each array of the two or more arrays when the access orientation signal indicates a column orientation.

Example 12 includes the system of Example 9, wherein the circuitry is further to generate a different row address for each array of the two or more arrays when the access orientation signal indicates a column orientation.

Example 13 includes the system of any of Examples 8 to 12, wherein the controller is further to provide a column-wise burst read operation.

Example 14 includes the system of Example 13, wherein the controller is further to transpose data from the two or more arrays after the column-wise burst read operation.

Example 15 includes a method, comprising controlling access to a memory device organized as two or more banks with two or more arrays per bank, and providing two-dimensional data access for the two or more banks of the memory device.

Example 16 includes the method of Example 15, further comprising selectively performing a data access operation in one of a row-wise direction and a column-wise direction in accordance with an access orientation signal.

Example 17 includes the method of Example 16, further comprising generating respective offsets for row addresses of the two or more arrays in accordance with the access orientation signal.

Example 18 includes the method of Example 16, further comprising summing a different fixed offset to a base row address for each array of the two or more arrays when the access orientation signal indicates a column orientation.

Example 19 includes the method of Example 16, further comprising generating a different row address for each array of the two or more arrays when the access orientation signal indicates a column orientation.

Example 20 includes the method of any of Examples 15 to 19, further comprising providing a column-wise burst read operation.

Example 21 includes the method of Example 20, further comprising transposing data from the two or more arrays after the column-wise burst read operation.

Example 22 includes the method of any of Examples 15 to 21, further comprising laying out data in the memory device in a matrix-major format.

Example 23 includes the method of Example 15, further comprising selecting respective rows of the two or more arrays of a bank for a memory access operation based on an access orientation signal.

Example 24 includes the method of Example 23, further comprising selecting a same row of each of the two or more arrays of the bank for the memory access operation when the access orientation signal indicates a row orientation, and selecting a different row of each of the two or more arrays of the bank for the memory access operation when the access orientation signal indicates a column orientation.

Example 25 includes the method of Example 23, further comprising selecting a first row of a first array of the two or more arrays of the bank, and selecting a second row of a second array of the two or more arrays of the bank, wherein the first row is different from the second row when the access orientation signal indicates a column orientation.

Example 26 includes the method of any of Examples 23 to 25, further comprising selecting the respective rows of the two or more arrays of the bank based on respective offsets in accordance with the access orientation signal.

Example 27 includes the method of Example 23, further comprising determining respective offsets for the two or more arrays of the bank in accordance with the access orientation signal, applying the determined respective offsets to a base row address to determine respective row addresses for the two or more arrays of the bank, and selecting the respective rows of the two or more arrays of the bank in accordance with the determined respective row addresses.

Example 28 includes the method of Example 23, further comprising summing respective fixed offsets with a base row address in accordance with the access orientation signal to determine respective row addresses for the two or more arrays of the bank, and selecting the respective rows of the two or more arrays of the bank in accordance with the determined respective row addresses.

Example 29 includes the method of any of Examples 15 to 28, wherein the memory device comprises embedded memory.

Example 30 includes at least one non-transitory one machine readable medium comprising a plurality of instructions that, in response to being executed on a computing device, cause the computing device to control access to a memory device organized as two or more banks with two or more arrays per bank, and provide two-dimensional data access for the two or more banks of the memory device.

Example 31 includes the at least one non-transitory one machine readable medium of Example 30, comprising a plurality of further instructions that, in response to being executed on the computing device, cause the computing device to selectively perform a data access operation in one of a row-wise direction and a column-wise direction in accordance with an access orientation signal.

Example 32 includes the at least one non-transitory one machine readable medium of Example 31, comprising a plurality of further instructions that, in response to being executed on the computing device, cause the computing device to generate respective offsets for row addresses of the two or more arrays in accordance with the access orientation signal.

Example 33 includes the at least one non-transitory one machine readable medium of Example 31, comprising a plurality of further instructions that, in response to being executed on the computing device, cause the computing device to sum a different fixed offset to a base row address for each array of the two or more arrays when the access orientation signal indicates a column orientation.

Example 34 includes the at least one non-transitory one machine readable medium of Example 31, comprising a plurality of further instructions that, in response to being executed on the computing device, cause the computing device to generate a different row address for each array of the two or more arrays when the access orientation signal indicates a column orientation.

Example 35 includes the at least one non-transitory one machine readable medium of any of Examples 30 to 34, comprising a plurality of further instructions that, in response to being executed on the computing device, cause the computing device to provide a column-wise burst read operation.

Example 36 includes the at least one non-transitory one machine readable medium of Example 35, comprising a plurality of further instructions that, in response to being executed on the computing device, cause the computing device to transpose data from the two or more arrays after the column-wise burst read operation.

Example 37 includes the at least one non-transitory one machine readable medium of any of Examples 30 to 36, comprising a plurality of further instructions that, in response to being executed on the computing device, cause the computing device to lay out data in the memory device in a matrix-major format.

Example 38 includes the at least one non-transitory one machine readable medium of Example 30, comprising a plurality of further instructions that, in response to being executed on the computing device, cause the computing device to select respective rows of the two or more arrays of a bank for a memory access operation based on an access orientation signal.

Example 39 includes the at least one non-transitory one machine readable medium of Example 38, comprising a plurality of further instructions that, in response to being executed on the computing device, cause the computing device to select a same row of each of the two or more arrays of the bank for the memory access operation when the access orientation signal indicates a row orientation, and select a different row of each of the two or more arrays of the bank for the memory access operation when the access orientation signal indicates a column orientation.

Example 40 includes the at least one non-transitory one machine readable medium of Example 38, comprising a plurality of further instructions that, in response to being executed on the computing device, cause the computing device to select a first row of a first array of the two or more arrays of the bank, and select a second row of a second array of the two or more arrays of the bank, wherein the first row is different from the second row when the access orientation signal indicates a column orientation.

Example 41 includes the at least one non-transitory one machine readable medium of any of Examples 38 to 40, comprising a plurality of further instructions that, in response to being executed on the computing device, cause the computing device to select the respective rows of the two or more arrays of the bank based on respective offsets in accordance with the access orientation signal.

Example 42 includes the at least one non-transitory one machine readable medium of Example 38, comprising a plurality of further instructions that, in response to being executed on the computing device, cause the computing device to determine respective offsets for the two or more arrays of the bank in accordance with the access orientation signal, apply the determined respective offsets to a base row address to determine respective row addresses for the two or more arrays of the bank, and select the respective rows of the two or more arrays of the bank in accordance with the determined respective row addresses.

Example 43 includes the at least one non-transitory one machine readable medium of Example 38, comprising a plurality of further instructions that, in response to being executed on the computing device, cause the computing device to sum respective fixed offsets with a base row address in accordance with the access orientation signal to determine respective row addresses for the two or more arrays of the bank, and select the respective rows of the two or more arrays of the bank in accordance with the determined respective row addresses.

Example 44 includes the at least one non-transitory one machine readable medium of any of Examples 30 to 43, wherein the memory device comprises embedded memory.

Example 45 includes an apparatus, comprising means for controlling access to a memory device organized as two or more banks with two or more arrays per bank, and means for providing two-dimensional data access for the two or more banks of the memory device.

Example 46 includes the apparatus of Example 45, further comprising means for selectively performing a data access operation in one of a row-wise direction and a column-wise direction in accordance with an access orientation signal.

Example 47 includes the apparatus of Example 46, further comprising means for generating respective offsets for row addresses of the two or more arrays in accordance with the access orientation signal.

Example 48 includes the apparatus of Example 46, further comprising means for summing a different fixed offset to a base row address for each array of the two or more arrays when the access orientation signal indicates a column orientation.

Example 49 includes the apparatus of Example 46, further comprising means for generating a different row address for each array of the two or more arrays when the access orientation signal indicates a column orientation.

Example 50 includes the apparatus of any of Examples 45 to 49, further comprising means for providing a column-wise burst read operation.

Example 51 includes the apparatus of Example 50, further comprising means for transposing data from the two or more arrays after the column-wise burst read operation.

Example 52 includes the apparatus of any of Examples 45 to 51, further comprising means for laying out data in the memory device in a matrix-major format.

Example 53 includes the apparatus of Example 45, further comprising means for selecting respective rows of the two or more arrays of a bank for a memory access operation based on an access orientation signal.

Example 54 includes the apparatus of Example 53, further comprising means for selecting a same row of each of the two or more arrays of the bank for the memory access operation when the access orientation signal indicates a row orientation, and means for selecting a different row of each of the two or more arrays of the bank for the memory access operation when the access orientation signal indicates a column orientation.

Example 55 includes the apparatus of Example 53, further comprising means for selecting a first row of a first array of the two or more arrays of the bank, and means for selecting a second row of a second array of the two or more arrays of the bank, wherein the first row is different from the second row when the access orientation signal indicates a column orientation.

Example 56 includes the apparatus of any of Examples 53 to 55, further comprising means for selecting the respective rows of the two or more arrays of the bank based on respective offsets in accordance with the access orientation signal.

Example 57 includes the apparatus of Example 53, further comprising means for determining respective offsets for the two or more arrays of the bank in accordance with the access orientation signal, means for applying the determined respective offsets to a base row address to determine respective row addresses for the two or more arrays of the bank, and means for selecting the respective rows of the two or more arrays of the bank in accordance with the determined respective row addresses.

Example 58 includes the apparatus of Example 53, further comprising means for summing respective fixed offsets with a base row address in accordance with the access orientation signal to determine respective row addresses for the two or more arrays of the bank, and means for selecting the respective rows of the two or more arrays of the bank in accordance with the determined respective row addresses.

Example 59 includes the apparatus of any of Examples 45 to 58, wherein the memory device comprises embedded memory.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various examples may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one example may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the examples are not limited to the examples so described, but can be practiced with modification and alteration without departing from the scope of the appended claims. For example, the above examples may include specific combination of features. However, the above examples are not limited in this regard and, in various implementations, the above examples may include the undertaking only a subset of such features, undertaking a different order of such features, undertaking a different combination of such features, and/or undertaking additional features than those features explicitly listed. The scope of the examples should, therefore, be determined with reference to the appended claims, along with the full scope of equivalents to which such claims are entitled.

What is claimed is:

1. An apparatus, comprising:
multiple arrays each comprising a respective plurality of memory cells, wherein a memory bank comprises each of the multiple arrays; and
circuitry comprising:
multiple column decoder circuits each coupled to a different respective array of the multiple arrays, and
multiple row decoder circuits each coupled to a different respective array of the multiple arrays,
the circuitry to perform a memory access operation to access bits each at a different respective array of the multiple arrays, wherein the memory access operation is to be based on each of a row address, a column address, and a control signal which is to indicate an arrangement of the bits relative to each other, wherein the circuitry to perform the memory access operation comprises:
the multiple column decoder circuits each to select a respective column of the respective array based on the column address; and
the multiple row decoder circuits to perform either of:
a selection of each row in a first set of rows based on an indication of a first arrangement of the bits by the control signal; and
a selection of rows each of a different respective set of rows of multiple sets of rows based on an indication of a second arrangement of the bits by the control signal;

wherein:
the first arrangement is different than the second arrangement;
the multiple sets of rows comprise the first set of rows; and
for each set of rows of the multiple sets of rows:
each row of the set of rows is a row of a different respective array of the multiple arrays; and
for each array of the multiple arrays, the set of rows comprises a respective row of the array.

2. The apparatus of claim 1, wherein:
the row address is a first row address;
the circuitry further comprises an offset generator circuit which is coupled to receive:
the control signal; and
a first address signal which is to comprise an identifier of the row address; and
for each row decoder circuit of the multiple row decoder circuits, the offset generator circuit is to:
determine a respective address offset value based on the control signal;
determine a respective second row address based on the first row address and the respective address offset value; and
transmit to the row decoder circuit a respective second address signal which is to comprise an identifier of the respective second row address.

3. The apparatus of claim 1, wherein:
each of the multiple row decoder circuits is coupled to receive a first address signal which is to comprise an identifier of the row address; and
one or more of the multiple row decoder circuits are each coupled to receive the control signal.

4. The apparatus of claim 3, wherein the one or more of the multiple row decoder circuits are each to:
determine a respective address offset amount based on the control signal; and
select a respective row of the respective array based on the first address signal and the respective address offset amount.

5. The apparatus of claim 1, wherein an embedded memory comprises the multiple arrays.

6. A system, comprising:
a processor;
a memory device comprising:
multiple arrays which each comprise a respective plurality of memory cells, wherein a memory bank of the memory device comprises each of the multiple arrays;
multiple column decoder circuits each coupled to a different respective array of the multiple arrays; and
multiple row decoder circuits each coupled to a different respective array of the multiple arrays; and
a controller communicatively coupled to the processor and the memory device, the memory device comprising circuitry to signal the memory device to perform a memory access operation which is to access bits each at a different respective array of the multiple arrays, wherein the memory access operation is to be based on each of a row address, a column address, and a control signal which is to indicate an arrangement of the bits relative to each other, wherein the memory device to perform the memory access operation comprises:
the multiple column decoder circuits each to select a respective column of the respective array based on the column address; and
the multiple row decoder circuits to perform either of:

a selection of each row in a first set of rows based on an indication of a first arrangement of the bits by the control signal; and a selection of rows each of a different respective set of rows of multiple sets of rows based on an indication of a second arrangement of the bits by the control signal;

wherein:

the first arrangement is different than the second arrangement;

the multiple sets of rows comprise the first set of rows; and for each set of rows of the multiple sets of rows:

each row of the set of rows is a row of a different respective array of the multiple arrays; and for each array of the multiple arrays, the set of rows comprises a respective row of the array.

7. The system of claim 6, wherein:

the row address is a first row address;

the circuitry further comprises an offset generator circuit which is coupled to receive:

the control signal; and a first address signal which is to comprise an identifier of the row address; and for each row decoder circuit of the multiple row decoder circuits, the offset generator circuit is to:

determine a respective address offset value based on the control signal;

determine a respective second row address based on the first row address and the respective address offset value; and transmit to the row decoder circuit a respective second address signal which is to comprise an identifier of the respective second row address.

8. The system of claim 7, wherein each of the multiple row decoder circuits is coupled to receive a first address signal which is to comprise an identifier of the row address; and one or more of the multiple row decoder circuits are each coupled to receive the control signal.

9. The system of claim 8, wherein the one or more of the multiple row decoder circuits are each to:

determine a respective address offset amount based on the control signal; and select a respective row of the respective array based on the first address signal and the respective address offset amount.

10. The system of claim 6, wherein the controller is further to:

provide a column-wise burst read operation.

11. The system of claim 10, wherein the controller is further to:

transpose data from the multiple arrays after the column-wise burst read operation.

12. The system of claim 6, wherein the processor, the memory device, and the controller are all integrated on a same integrated circuit die.

13. The system of claim 6, wherein the processor, memory device, and the controller are all integrated on a two or more integrated circuit die of a same multi-die package.

14. A method, comprising:

receiving a row address and a column address each of a memory access command;

receiving a control signal; and performing a memory access operation based on each of the row address, the column address, and the control signal;

wherein:

the multiple arrays each comprise a respective plurality of memory cells;

a memory bank comprises each of the multiple arrays;

multiple column decoder circuits are each coupled to a different respective array of the multiple arrays;

multiple row decoder circuits are each coupled to a different respective array of the multiple arrays;

the memory access operation is to access bits each at a different respective array of the multiple arrays;

the control signal which indicates an arrangement of the bits relative to each other;

performing the memory access operation comprises:

the multiple column decoder circuits each selecting a respective column of the respective array based on the column address; and the multiple row decoder circuits performing either of:

a selection of each row in a first set of rows based on an indication of a first arrangement of the bits by the control signal; and a selection of rows each of a different respective set of rows of multiple sets of rows based on an indication of a second arrangement of the bits by the control signal;

the first arrangement is different than the second arrangement;

the multiple sets of rows comprise the first set of rows; and for each set of rows of the multiple sets of rows:

each row of the set of rows is a row of a different respective array of the multiple arrays; and for each array of the multiple arrays, the set of rows comprises a respective row of the array.

15. The method of claim 14, wherein:

the row address is a first row address; and the method further comprises:

for each row decoder circuit of the multiple row decoder circuits:

determining a respective address offset value based on the control signal;

determining a respective second row address based on the first row address and the respective address offset value; and transmitting to the row decoder circuit a respective address signal which is to comprise an identifier of the respective second row address.

16. The method of claim 14, wherein:

each of the multiple row decoder circuits receives a first address signal which comprises an identifier of the row address; and one or more of the multiple row decoder circuits each receive the control signal.

17. The method of claim 16, wherein the one or more of the multiple row decoder circuits each:

determine a respective address offset amount based on the control signal; and select a respective row of the respective array based on the first address signal and the respective address offset amount.

* * * * *